(12) United States Patent
Brown

(10) Patent No.: US 8,342,902 B2
(45) Date of Patent: Jan. 1, 2013

(54) DEER CALL

(76) Inventor: John Christopher Brown, Hanover, MD (US)

( * ) Notice: Subject to any disclaimer, the term of this patent is extended or adjusted under 35 U.S.C. 154(b) by 199 days.

(21) Appl. No.: 12/902,739

(22) Filed: Oct. 12, 2010

(65) Prior Publication Data

US 2012/0088432 A1 Apr. 12, 2012

(51) Int. Cl.
*A63H 5/00* (2006.01)
(52) U.S. Cl. ............... 446/208; 446/202; 446/207
(58) Field of Classification Search .......... 446/202–209
See application file for complete search history.

(56) References Cited

U.S. PATENT DOCUMENTS

| | | | | |
|---|---|---|---|---|
| 3,955,313 | A * | 5/1976 | Faulk | 446/208 |
| 4,764,145 | A * | 8/1988 | Kirby | 446/208 |
| 4,940,451 | A * | 7/1990 | Leady | 446/208 |
| 5,222,903 | A * | 6/1993 | Parrott et al. | 446/207 |
| 5,577,946 | A | 11/1996 | Oathout | |
| 5,885,127 | A * | 3/1999 | Colyer | 446/208 |
| 6,039,627 | A * | 3/2000 | Forbes et al. | 446/208 |
| 6,106,357 | A | 8/2000 | Weiser | |
| 6,547,627 | B1 * | 4/2003 | Oathout | 446/208 |
| 7,083,492 | B1 * | 8/2006 | Morocco et al. | 446/208 |
| 2012/0028536 | A1 * | 2/2012 | Jacobsen | 446/207 |

* cited by examiner

*Primary Examiner* — Gene Kim
*Assistant Examiner* — Urszula M Cegielnik
(74) *Attorney, Agent, or Firm* — Welsh Flaxman & Gitler LLC

(57) ABSTRACT

A deer call includes a cylindrical mouthpiece in which a reed assembly is mounted for oscillatory movement creating a sound replicating that of a deer and a sound attenuating tube secured to the mouthpiece. The mouthpiece is composed of a rigid tubular member and an elastic skin secured about the tubular member. The rigid tubular member includes a central cut-out section exposing the elastic skin to an interior of the mouthpiece thereby defining the elastic skin resonance control surface, wherein the elastic skin in the area of the elastic skin resonance control surface includes a sound control aperture allowing the user to control air pressure within the mouthpiece and thereby control amplitude of sound generated by the deer call.

8 Claims, 2 Drawing Sheets

DEER CALL

BACKGROUND OF THE INVENTION

1. Field of the Invention

The present invention relates to deer calls.

2. Description of the Related Art

Hunters often use deer calls to attract deer to their location while hunting. While many deer calls have been developed, there exist limitations in their ability to replicate deer sounds in an efficient and effective manner.

SUMMARY OF THE INVENTION

It is, therefore, an object of the present invention to provide a deer call including a cylindrical mouthpiece in which a reed assembly is mounted for oscillatory movement creating a sound replicating that of a deer and a sound attenuating tube secured to the mouthpiece. The mouthpiece includes a first end and a second end, and an annular wall extends between the first end and the second end of the mouthpiece to define a resonance chamber. The first end of the mouthpiece includes a mounting assembly which supports a first end of a reed member of the reed assembly in a manner permitting oscillatory movement thereof when one blows into the second end of the mouthpiece. The second end of the mouthpiece is shaped and dimensioned for engagement with lips of a user during use of the deer call and includes an opening in fluid communication with the resonance chamber. The mouthpiece is composed of a rigid tubular member and an elastic skin secured about the tubular member. The rigid tubular member includes a central cut-out section exposing the elastic skin to an interior of the mouthpiece thereby defining the elastic skin resonance control surface, wherein the elastic skin in the area of the elastic skin resonance control surface includes a sound control aperture allowing the user to control air pressure within the mouthpiece and thereby control amplitude of sound generated by the deer call.

It is also an object of the present invention to provide a deer call wherein the central cut-out section is in the shape of an ellipse.

It is another object of the present invention to provide a deer call wherein the elastic skin covering the central cut-out section bows inwardly toward a central axis of the mouthpiece.

It is a further object of the present invention to provide a deer call wherein the elastic skin is made of rubber.

It is also an object of the present invention to provide a deer call wherein the reed member includes an upper surface and a lower surface, as well as a free first end and a secured, second end.

It is another object of the present invention to provide a deer call wherein the reed assembly also includes a vibration control block positioned beneath the reed member in a facing relationship with the lower surface of the reed member.

It is a further object of the present invention to provide a deer call wherein the sound control aperture is positioned such that it is in alignment with a fixed second end of the reed member adjacent the first end of the mouthpiece.

It is also an object of the present invention to provide a deer call wherein the deer call has a longitudinal axis extending along its long axis, and the sound control aperture and the fixed second end of the reed member are positioned at a similar location along the longitudinal axis.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Figure 1:
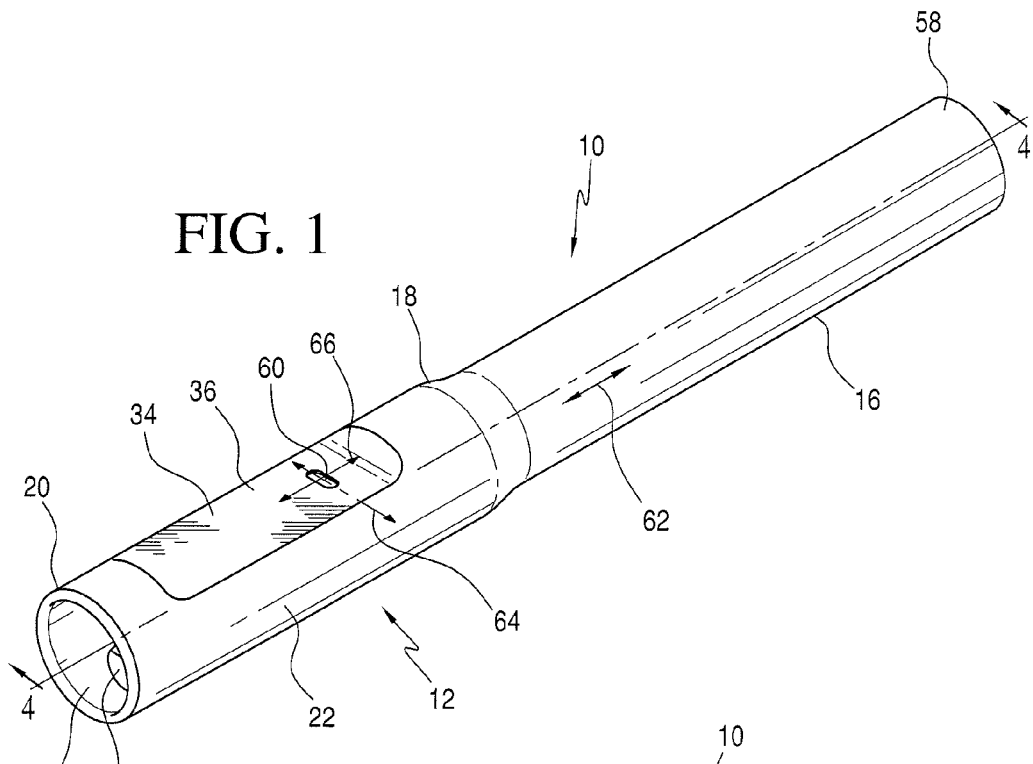
FIG. 1 is a perspective view of the present deer call.
Figure 2:
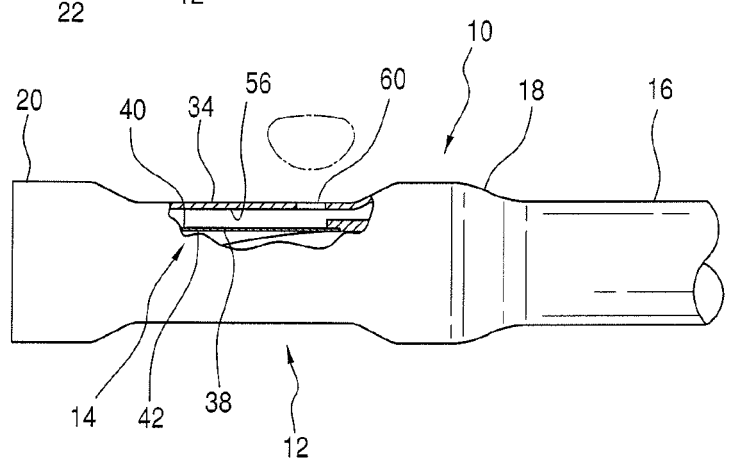
FIG. 2 is a partial cross sectional side view of the present deer call with the sound control aperture uncovered.
Figure 3:
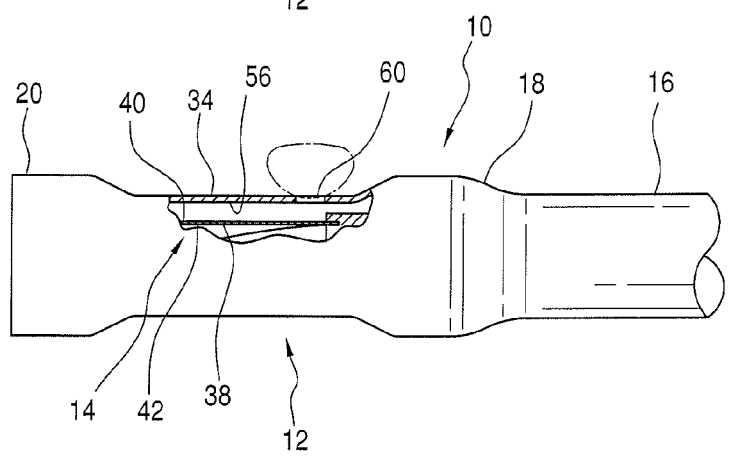
FIG. 3 is a partial cross sectional side view of the present deer call with the sound control aperture covered.
Figure 4:
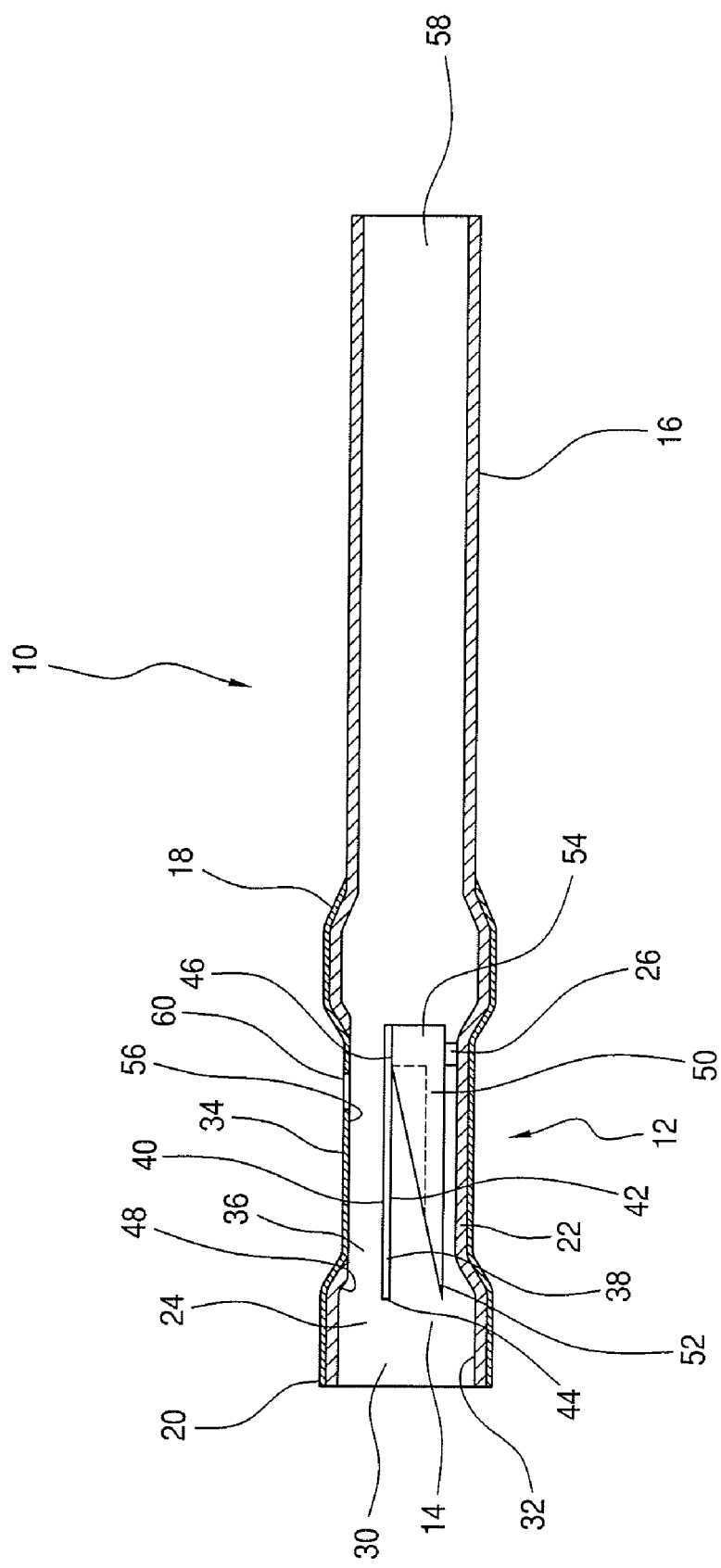
FIG. 4 is a cross sectional view along the line 4-4.

In accordance with the present invention, and with reference to FIGS. 1 to 4, a deer call 10 is disclosed. The deer call 10 includes a cylindrical mouthpiece 12 in which a reed assembly 14 is mounted for oscillatory movement creating a sound replicating that of a deer. A sound attenuating tube 16 is secured to the mouthpiece 12.

The mouthpiece 12 includes a first end 18 and a second end 20. The annular wall 22 extending between the first end 18 and the second end 20 of the mouthpiece 12 defines a resonance chamber 24. The first end 18 is substantially circular in cross-section and is in fluid communication with the resonance chamber 24. The first end 18 of the mouthpiece 12 includes a mounting assembly 26 which supports a first end 28 of a reed member 38 of the reed assembly 14 in a manner permitting oscillatory movement thereof when one blows into the second end 20 of the mouthpiece 12. The second end 20 is commonly understood to be the mouthpiece end and is, therefore, shaped and dimensioned for engagement with the lips of a user during use of the present deer call 10. The mouthpiece end 20, positioned opposite first end 18, includes an opening 30 in fluid communication with the resonance chamber 24 and the first end 18.

The mouthpiece 12 is generally composed of a rigid tubular member 32 and an elastic skin 34 secured about the tubular member 32. The rigid tubular member 32 includes a central cut-out section 36 exposing the elastic skin 34 to the interior of the mouthpiece 12, and defining an elastic skin resonance control surface 37 where the elastic skin 34 is exposed to the interior of the mouthpiece 12. The central cut-out section 36 is generally in the shape of an ellipse, and consequently the elastic skin 34 covering the central cut-out section 36 bows inwardly toward central axis of the mouthpiece 12 when it is pulled tightly over the rigid tubular member 32. As will be appreciated based upon the following disclosure, the central cut-out section 36 allows for interaction between the reed member 38 and the elastic skin 34. In a preferred embodiment, the elastic skin 34 is made of synthetic or natural rubber and serves to connect the mouthpiece 12 to the sound attenuating tube 16 by overlapping the rigid tubular member 32 and the sound attenuating tube 16. The rubber material has a non-reflective matte black finish. In addition to reducing reflections, the rubber material also minimizes any sounds produced by incidental contact between the deer call 10 and other objects, such as, e.g., a hunter's weapon.

In accordance with a preferred embodiment, the elastic skin 34 fully encases the rigid tubular member 32 and extends fully from the first end 18 of the mouthpiece 12 to the second end 20 of the mouthpiece 12. As a result, the relatively softer elastic skin 34 material, rather than the rigid tubular member 32 contacts the mouth of the user during operation of the deer call 10.

As briefly discussed above, the present deer call 10 includes a reed assembly 14 which is mounted within the mouthpiece 12 at the first end 18 of the mouthpiece 12. The reed assembly 14 generally includes a reed member 38 composed of an elongated, flexible member shaped and dimensioned for vibrational, oscillatory movement as a user blows into the second end 20 of the mouthpiece 12. The reed member 38 includes an upper surface 40 and a lower surface 42. The reed member 38 also includes a free first end 44 and a secured, second end 46. Space is maintained between the interior wall 48 of the mouthpiece 12 and the upper and lower surfaces 40, 42 of the reed member 38 such that fluid communication between the free, first end 44 and the secured, second end 46 of the reed member 38 is possible.

The reed assembly 14 also includes a vibration control block 50 positioned beneath the reed member 38 in a facing relationship with the lower surface 42 of the reed member 38. The vibration control block 50 is secured to the mounting assembly 26 at the first end 18 of the mouthpiece 12 and similarly includes a free, first end 52 and a secured, second end 54 attached to the mounting assembly 26. The vibration control block 50 is spaced from both the interior wall 48 of the mouthpiece 12 and the lower surface 42 of the reed member 38 to limit to the range of motion through which the reed member 38 is permitted to oscillate as the a user blows into the mouthpiece end 20 of the mouthpiece 12.

A sound attenuating tube 16 is secured to, and extends from, the first end 18 of the mouthpiece 12. The sound attenuating tube 16 is secured to the first end 18 of the mouthpiece 12 in a manner permitting the free flow of air through the mouthpiece 12 and into the sound attenuating tube 16. The sound attenuating tube 16 is preferably formed of a flexible material, such as, e.g., corrugated plastic, to facilitate manipulating the sound attenuating tube 16 during use of the deer call 10. The sound attenuating tube 16 is dimensioned in length depending upon the operating requirements and desired sound characteristics.

As those skilled in the art will appreciate, sound is generated when the reed member 38 oscillates between the interior surface 56 of the elastic skin 34 exposed by way of the central cut-out section 36 and the vibration control block 50. This oscillation causes disruption of the air blown through the deer call 10 creating a desired sound that is ultimately transmitted through the sound attenuating tube 16. In addition to the other characteristics of the elastic skin 34 discussed above, the positioning of the elastic skin 34 in alignment with the reed member 38 allows for control of the vibratory characteristics of the reed member 38. By adjusting the vibratory characteristics of the reed member 38 one is able to control the sound generated by the present deer call to more closely replicate the sound of a buck, doe or fawn. In particular, depending upon where the user presses upon the elastic skin 34 in the area of the elastic skin resonance control surface 37 the generated sound increases or decreases in frequency thereby producing a high or lower pitched sound; that is, pressing closer to the second end 20 of the mouthpiece 12 generates a lower pitched sound while pressing upon the elastic skin 34 in the area of the elastic skin resonance control surface 37 closer to the first end of the mouthpiece 12 generates a higher pitched sound.

In operation, the second end 20 of the mouthpiece 12 is positioned against the mouth of the user, and the user exhales to produce a call. The exhaled air from the user into and through mouthpiece 12 causes the reed member 38 to vibrate and produce sound that travel toward and exits the outlet end 58 of the sound attenuating tube 16. The elastic skin 34 surrounding the mouthpiece 12 and the sound attenuating tube 16 is air-tight and ensures that substantially all of the exhaled air travels through the mouthpiece 12, over the reed member 38 and out the outlet end 58 without leakage.

In addition to the ability to press upon the elastic skin 34 in the area of the central cut-out section 36, that is, along the elastic skin resonance control surface 37 where the elastic skin 34 is exposed to the interior of the mouthpiece 12, for either raising or lowering the pitch of the generated sound, the sounds produced by the present deer call 10 are adjusted by the provision of a sound control aperture 60 formed within the elastic skin resonance control surface 37 of the elastic skin 34 in the area of the central cut-out section 36. The sound control aperture 60 is positioned such that it is substantially in alignment with the fixed second end 46 of the reed member 38 toward the first end of the mouthpiece 12. That is, the deer call 10 has a longitudinal axis 62 extending along its long axis, and the sound control aperture 60 and the fixed second end 46 of the reed member 38 are positioned at a similar location along the longitudinal axis 62.

In accordance with a preferred embodiment, the sound control aperture 60 is elongated and includes a long first axis 64 and a lateral short second axis 66, wherein the long first axis 64 is oriented substantially perpendicular to the longitudinal axis 62 of the deer call 10. While an elongated elliptical sound control aperture is disclosed in accordance with a preferred embodiment, it is contemplated the sound control aperture may take other shapes without departing from the spirit of the present invention.

In practice, a user, by covering and uncovering, either partially or completely, the sound control aperture 60 with his or her finger is able to smooth out the generated sound creating a more natural sound for communicating with deer. For example, a user may readily control the volume of the deer call by adjusting the position of his or her finger relative to the sound control aperture to smoothly fade out a deer call or to abruptly transition a deer call. In fact, a user could provide a rolling deer call, that is, continuous high and low amplitude deer calls, by simply moving his or her finger toward and away from the sound control aperture in a repeating pattern. Without the sound control aperture, the generated sound is solely based upon the pressure with which a user expels (or blows) air through the deer call 10. However, the sound control aperture 60 allows the user to control the air pressure within the mouthpiece 12 and thereby control the amplitude of the sound generated by the deer call 10.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A deer call, comprising:
   a cylindrical mouthpiece in which a reed assembly is mounted for oscillatory movement creating a sound replicating that of a deer; and
   a sound attenuating tube secured to the mouthpiece;
   the mouthpiece includes a first end and a second end, and an annular wall extends between the first end and the second end of the mouthpiece to define a resonance chamber, the first end of the mouthpiece includes a mounting assembly which supports a first end of a reed member of the reed assembly in a manner permitting oscillatory movement thereof when one blows into the second end of the mouthpiece, the second end of the mouthpiece is shaped and dimensioned for engagement with lips of a user during use of the deer call and includes an opening in fluid communication with the resonance chamber;

the mouthpiece is composed of a rigid tubular member and an elastic skin secured about the tubular member, the rigid tubular member includes a central cut-out section exposing the elastic skin to an interior of the mouthpiece thereby defining the elastic skin resonance control surface, wherein the elastic skin in the area of the elastic skin resonance control surface includes a sound control aperture allowing the user to control air pressure within the mouthpiece and thereby control amplitude of sound generated by the deer call.

2. The deer call according to claim 1, wherein the central cut-out section is in the shape of an ellipse.

3. The deer call according to claim 1, wherein the elastic skin covering the central cut-out section bows inwardly toward a central axis of the mouthpiece.

4. The deer call according to claim 1, wherein the elastic skin is made of rubber.

5. The deer call according to claim 1, wherein the reed member includes an upper surface and a lower surface, as well as a free first end and a secured, second end.

6. The deer call according to claim 5, wherein the reed assembly also includes a vibration control block positioned beneath the reed member in a facing relationship with the lower surface of the reed member.

7. The deer call according to claim 1, wherein the sound control aperture is positioned such that it is in alignment with a fixed second end of the reed member adjacent the first end of the mouthpiece.

8. The deer call according to claim 7, wherein the deer call has a longitudinal axis extending along its long axis, and the sound control aperture and the fixed second end of the reed member are positioned at a similar location along the longitudinal axis.

* * * * *